United States Patent
Soda et al.

[11] 3,881,984
[45] May 6, 1975

[54] APPARATUS FOR PREPARATION OF SYNTHETIC WOOD

[75] Inventors: Shigenari Soda, Kyoto; Tatsujiro Seki, Shigeru Daiguji, Motoshige Hayashi, Nara, all of Japan

[73] Assignee: Sekisui Kaseihin Kogyo K.K.

[22] Filed: Jan. 9, 1973

[21] Appl. No.: 322,130

Related U.S. Application Data

[62] Division of Ser. No. 61,247, Aug. 5, 1970, Pat. No. 3,720,572.

[30] Foreign Application Priority Data
Aug. 7, 1969  Japan.............................. 44-62749

[52] U.S. Cl................ 156/500; 425/114; 425/131; 425/463; 425/464; 425/465; 425/466
[51] Int. Cl.................................. B29b 5/00
[58] Field of Search........ 156/244, 500; 264/46, 51, 264/53, 211, 232, 321; 425/66, 72, 109, 113, 114, 130, 131, 324, 325, 326, 376, 378, 380, 382, 463, 464, 465, 466

[56] References Cited
UNITED STATES PATENTS

| | | | |
|---|---|---|---|
| 2,408,713 | 10/1946 | Webb | 425/464 |
| 2,968,834 | 1/1961 | Groombridge et al | 425/464 |
| 3,259,938 | 7/1966 | Martin | 425/464 |
| 3,413,387 | 11/1968 | Ohsol | 264/46 |
| 3,431,164 | 3/1969 | Gilbert | 264/53 |
| 3,647,329 | 3/1972 | Reifenhauser et al | 156/244 |

*Primary Examiner*—Caleb Weston
*Attorney, Agent, or Firm*—Armstrong, Nikaido & Wegner

[57] ABSTRACT

A synthetic wood being an elongated microporous article formed of a plurality of coalesced, foamed resin strands, each being in intimate contact with each other, and each having a higher density in its outer surface and lower density in its inner portion. Thus, the cross section of the synthetic wood comprises a frame distributed in a reticulate form. The synthetic wood of the invention is produced by extruding softened thermoplastic resin containing expanding agents into a plurality of expandable strands by passing the same through a die at the discharge end of an extruder, the die having a number of apertures and coalescing the strands into a microporous article having a desired cross-sectional area while the strands are still in a softened state, wherein the space in which each individual strand is allowed to expand is restricted to provide each of the strands with a higher density outer surface.

33 Claims, 29 Drawing Figures

3,881,984

APPARATUS FOR PREPARATION OF SYNTHETIC WOOD

CROSS REFERENCE TO RELATED APPLICATION

This is a divisional application of copending U.S. application Ser. No. 61,247 filed Aug. 5, 1970, now Pat. No. 3,720,572, by the inventors herein.

BACKGROUND OF THE INVENTION

Timber cannot be expected to have consistent properties, being from trees. Thus, for example, it is generally difficult to obtain a long and wide timber without knots, as wood often contains considerable amounts of knots. Wood has recently risen in price, as it has become widely used in various fields. Thus, a demand has arisen for the manufacture of synthetic wood having a similar appearance to and the properties of natural wood.

Expanded articles made from hard synthetic resins and having a great number of micropores with an average diameter of less than 1 mm are known. For example, a microporous polystyrene article expanded about 20–50 times in volume, manufactured by extruding polystyrene containing hydrocarbons such as pentane, butane and propane as well as sodium bicarbonate and citric acid through a die provided with a single aperture at an elevated temperature, has been proposed. Such a microporous polystyrene article has physical properties more akin to those of natural wood as compared with non-expanded polystyrene. Although the microporous polystyrene is said to be synthetic wood, it does not exhibit properties equal to natural wood such as the ability to be cut with a saw, planing, mutual fixing with nails and also in mechanical strength.

Investigation of causes which make the microporous polystyrene article different from the natural wood in nature has led to the discovery that one of the causes is the fact that microporous polystyrene does not possess the "annual ring" structure which is constituted by both low density portions and high density portions coexisting alternately, though natural wood has such structure. We have now discovered a method by which low density portions and high density portions corresponding to the annual ring structure of natural wood can be formed in the microporous polystyrene article. As a result, it has been found that it is possible to provide microporous polystyrene with alternate low density and high density portions by extruding polystyrene containing expanding agents through a die provided with many apertures to form individual strands, and to coalesce said strands into one body under such conditions that the expansion of individual strands is restricted by bringing all said strands, while they are still expanding, into an area having a small cross-section. We have also found that in order to impart the annual-ring structure to the product, it is effective to produce different expansion rates within each strand, i.e., to produce a high density skin on the outer surface of each strand and to make the inner part of each strand low density. Moreover, it is also effective to produce differences of expansion rates between individual strands and to arrange the individual strands in various ways, regular or irregular. It is also effective in simulating natural wood to form layers of different densities in the manner described hereinabove, the layers corresponding to the uneven structure caused by the annual rings existing in natural wood.

A method for producing a microporous article has already been proposed. That method comprises extruding an expandable thermoplastic resin containing expanding agents through a die having a number of apertures to form the corresponding number of strands containing innumerable micropores, placing said strands in parallel relation, and coalescing said strands into a single article. The method is described in the Specification of U.S. Pat. No. 3,121,130 and in Japanese Patent Publication Sho. 35–10518. However, it is the object of the known methods and apparatus to obtain an evenly foamed article by expanding the strands uniformly; it has heretofore never been proposed to form layers of uneven expansion in the finished article. Also, known methods and apparatus are directed to obtaining a finished article expanded to as high a degree as possible; therefore, the strands extruded through apertures have been expanded to the maximum. Furthermore, in order to obtain a finished article expanded uniformly, it has been found desirable in the prior art to use a die provided with apertures which have identical shape and are located at equal intervals. Therefore, according to the previously known methods microporous articles which include layers of various densities cannot be obtained, and the article cannot resemble natural wood.

SUMMARY OF THE INVENTION

The present invention provides, in an apparatus for preparing synthetic wood which includes an extruding means for extruding softened thermoplastic resin containing expanding agents, die means disposed at the discharge end of said extruding means adapted to permit the extruded thermoplastic resin to pass therethrough to form a plurality of expanded strands, said die means including a first chamber and at least one plate having a plurality of apertures therethrough disposed on the outlet side of said chamber, and coalescing means disposed at the outlet side of said die means for coalescing said plurality of expanded strands into a microporous article having a desired cross-sectional area while said strands are still in a softened state, the improvement comprising at least one of said die and said coalescing means being constructed to restrict the space in which each individual strand is allowed to expand to provide each of said strands with a higher density outer surface. Preferably said apparatus further comprises a cooling element positioned and arranged so as to effect cooling of the outer surface the plurality of expanded strands at a point near the point of emergence of the expanded strands from the die means. In one embodiment, the apertures of said first plate of said die means have different land lengths to provide equal resin flow therethrough. The apparatus can further comprise resin temperature regulator means disposed between said extruding means and said die means. Said die means can further include a second chamber disposed on the outlet side of said first plate and a second plate having a plurality of apertures therethrough disposed on the outlet side of said second chamber. According to various embodiments at least some of said apertures are different from the remaining apertures, e.g., said apertures differ in length, said apertures differ in cross-sectional area, said apertures are substantially cylindrical and exhibit different diameters and/or at least one of said apertures has a small area opening at one end and a large area at the other end. Another embodiment, said plate is provided with a variable density of apertures. According to a preferred embodiment, the total cross-sectional area of said apertures is relatively small in relation to the expanding ability of said thermoplastic resin such that each of the resultant strands exhibits a high density outer surface and a low density interior. Said apertures can be constructed such that different strands have different densities. Optionally, said plate can be constructed to yield substantially identical strands each having low density interiors and high density skins. In one embodiment said chamber increases in cross-sectional area from the end adjacent said extruding means to said plate, said apertures being constructed to produce an overall pressure drop distribution compensating for the variance in the pressure drop produced by the change in the cross-sectional area of said chamber, a second, uniformly aperture plate being optionally disposed on the outlet side of the first plate and/or at least a portion of said apertures having the same length and enlarged and smaller portions, the apertures closest to the periphery having enlarged sections of greater length than those nearer the center. In a further embodiment said apertures are constructed to produce a lower pressure drop in the center apertures and a higher pressure drop in the peripheral apertures, by providing center apertures having larger cross-sectional areas than those of the peripheral apertures and/or the plate is thinner in the center than in the periphery. According to another aspect of the invention, the inlet sides of at least a number of the individual apertures have a relatively small cross-sectional portion and the outlet sides have relatively large cross-sectional portions, the size of the relatively large cross-sectional portions being such the expansion of said strands is restricted thereby. In another embodiment, peripheral apertures have enlarged inlet portions the lengths of which diminish toward the center apertures, the center apertures exhibiting constant diameters. Said coalescing means can include at least one pair oppositely disposed, non-driven rolls rotatable by frictioned contact with said strands, preferably a plurality of pairs of said rollers positioned such that said strands are nipped and compressed on all four sides bordering the moving path of said strands and more preferably further comprising a tapered frame engaging opposite sides of the group of strands in advance of said rollers. Said coalescing means in another embodiment comprises a tapered frame engaging and compressing opposite sides of the group of strands leaving said die means. The apparatus can further comprise blower means or heat exchange means positioned at the outlet end of said die means for cooling said strands. Preferably, the apparatus further comprises temperature regulator means disposed between said extruding means and said die means for regulating the temperature of said thermoplastic resin.

In a very preferred embodiment, the invention offers an apparatus for preparing synthetic wood comprising an extruding means for extruding softened thermoplastic resin containing expanding agents, die means disposed at the discharge end of said extruding means adapted to permit the extruded thermoplastic resin to pass therethrough to form a plurality of expanded strands, said die means including a first chamber, at least one plate having a plurality of apertures therethrough disposed on the oulet side of said chamber, a second chamber disposed on the outlet side of said first plate and a second plate having a plurality of apertures therethrough disposed on the outlet side of said second chamber, and coalescing means disposed at the outlet side of said die means for coalescing said plurality of expanded strands into a microporous article having a desired cross-sectional area while said strands are still in a softened state, at least one of said die and said coalescing means being constructed to restrict the space in which each individual strand is allowed to expand to provide each of said strands with a higher density outer surface. Preferably, said apparatus comprises resin temperature regulator means disposed between said extruding means and said die means and/or a cooling element positioned and arranged so as to effect cooling of the outer surface the plurality of expanded strands at a point near the point of emergence of the expanded strands from the die means. Preferably, the apertures of said first plate of said die means have different land lengths to provide equal resin flow therethrough. Most suitably, said coalescing means includes a plurality of pairs of said rollers positioned such that said strands are nipped and compressed on all four sides bordering the moving path of said strands.

BRIEF DESCRIPTION OF THE DRAWINGS

In the drawings wherein like reference characters are employed to designate like parts:

FIG. 24 (b) is a partial cross-sectional view of plate 1 taken along the line E—E of FIG. 24 (a).

DETAILED DESCRIPTION

Figure 1:
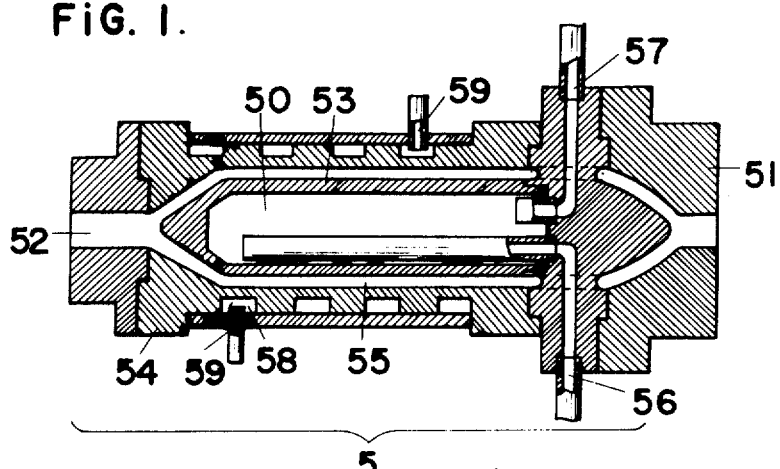
FIG. 1 is a cross-sectional view of the temperature regulator taken along the flowing direction of material.

The method carried out in conjunction with the apparatus of the present invention is characterized by depressing the expansion rates of individual extruded strands by restricting the spaces because of the adjacent strands wherein the strands expand to form the high density skin on the outer surface of individual strands, and/or letting at least a portion of the strands (as, for example, those located at the interior of the shaped article) have high density by increasing the amounts of resin against said spaces by employing said improved die.

The synthetic wood produced in the apparatus of the present invention is an elongated microporous article prepared by coalescing a number of foamed resin strands, said resin being a polymer of styrene and/or methyl methacrylate, each of said strands being unevenly foamed to have higher density in its outer surface and lower density in its inner portion, all said individual strands being coalesced intimately with adjacent strands without any substantial opening, thus in the cross section perpendicular to the longitudinal direction of said article said higher density portions constituting the frame distributed in a reticulate form in which lower density portions are filled, and said article having the average density in the range of 0.100 to 0.700 g/cc as a whole.

The above-mentioned synthetic wood will normally have good properties when the individual strands constituting said wood are of small cross-sectional area, that is when said wood satisfies the requirement that said individual strands have the cross-sectional area of 0.005 to 1.0 cm$^2$. Moreover, the above-mentioned synthetic wood will be further improved, when said wood satisfies the requirement that some of the individual strands have at least the deviations exceeding 10% of whole average density of said wood in the average densities of the individual strands. As for above deviations, they will be explained hereunder.

Assuming that said average density of the article as a whole is A and average density of a single strand is B, the density B of all strands should preferably be more than 0.2 × A. And, when all the individual strands are classified into three groups, that is, lower density strands, intermediate strands and higher density strands, according to the relation between their own average density B and the whole density A, it is preferable that the lower density strands and higher density strands account for more than a specific value in volume. Namely, when lower density strands is 0.2A ≦ B<0.95A, intermediate density strands 0.95A ≦ B ≦ 1.05A, and higher density strands 1.05A<B ≦ 1.00, it is preferable that said intermediate density strands account for less than 30 volume % of said wood, and both said lower and higher density strands account for more than 10 volume %. Further, it is also preferable that the density difference is more than 0.1 g/cc between the average density of said lower density strands and that of said higher density strands.

The resins to be employed in connection with the present invention are limited to the polymer of styrene and/or methyl methacrylate. The reason is that the invention aims at obtaining the synthetic wood which has similar properties to those of natural wood, and also that extruded strands in a softened state should be able to be coalesced to one another. The polymer of styrene referred to herein includes polystyrene as well as the copolymers of styrene and the other monomer or monomers in which styrene comprises the predominant portion by weight. Suitable co-monomers include butadiene, α-methyl styrene, isobutylene, acrylonitrile, acrylic acid, methacrylic acid and the like. A particularly useful multicomponent copolymer is acrylonitrile-butadiene-styrene copolymer, generally called as ABS resin. A mixture of this copolymer with styrene is also contemplated by the term polymer of styrene. Likewise, the polymer of methyl methacrylate includes polymethyl methacrylate and copolymers of methyl methacrylate with the aforementioned co-monomers in which methyl methacrylate comprises the predominant portion by weight.

In the method carried out by the present invention, to said resin are added an expanding agent or agents which form a great number of micropores in the resin. It is desirable that the micropores be as small as possible in size and as many as possible in number. For example, it is preferable to have 5–100 micropores exist in 1 mm$^2$. The expanding agent which forms the above-mentioned micropores is, for example, an aliphatic hydrocarbon such as pentane, butane or propane; or a gas generating compound such as azodicarboxylic acid amide and dinitrosopentamethylenetetramine. When sodium bicarbonate and citric acid or other expansion-assisting agents are added to said expanding agent, the micropores become more minute in size and are increased in number. The expanding agent increases the extruded resin in apparent volume, wherein the expansion ratio must be controlled to be less than about 10 times, because it is the purpose of this invention to obtain an article similar to natural wood. From experimental work, it has been found necessary to control the average density A of whole desired article within the range of 0.10 to 0.70 g/cc.

The expanding agent may be added to the thermoplastic resin before being fed to the extruder or in the course of extrusion. That is, expanding agent is mixed with the resin beforehand, and then the mixture may be fed to the extruder, or the resin is fed to the extruder and expanding agent may be added to the molten resin in the extruder.

As mentioned above, the invention aims at obtaining synthetic wood which is usually more expensive as the width is greater; therefore, for obtaining such a broad synthetic wood it is sometimes necessary to extrude a large amount of resin over an extensive range in one direction of cross-sectional area. However, it is not easy to extrude the resin over such an extensive range. The reason is that it is not easy to maintain the resin in a uniformly molten state over a wide range of cross-sectional area. Thereupon, in order to maintain the resin in a uniformly molten state, specific means is required. One of such means is the provision of a temperature regulator between the extruder and the die, wherein the resin is maintained in a uniformly molten state in the temperature regulator. One example of the temperature regulator is shown in FIG. 1.

Numeral 51 (FIG. 1) denotes the side of the temperature regulator whereto the discharge end of extruder is attached, and numeral 52 denotes the other side of the temperature regulator whereto the die is attached. The temperature regulator houses a torpedo-like member 53, and an annular passage 55 is defined between torpedo 53 and outer sheath 54. Torpedo 53 houses a cavity 50 whereto pipes 56 and 57 extend, and a heating or cooling medium is circulated through said pipes 56 and 57 to heat or cool torpedo 53. Outer sheath 54 is provided with a groove 58 along the outer surface of the outer sheath. The heating or cooling medium is also circulated through the groove 58 via pipes 59 and 59', whereby outer sheath 54 is heated or cooled. Thus, the resin passing through the passage 55 is heated or cooled through both outer sheath 54 and torpedo 53, and the resin temperature can be controlled within a narrow temperature range.

According to the method associated with the invention, it is necessary to extrude the resin containing expanding agents through the die having a number of apertures which are distributed in said die over the range similar to the cross-sectional area of desired article. It is already known to extrude the resin containing expanding agents through said die. However, the die preferably employed in the invention is characterized by the following. First, the ratio of the cross-sectional area of the apertures to that of the die is greater than the expanding ability of the resin containing expanding agents, thus letting resin strands extruded through the apertures have high density skins. Second, all of said apertures are formed in specific shapes or some of said apertures are formed of an identical shape, for example, some of apertures positioned at the inner part of the die are made different in shapes, lengths, sizes, or distribution of apertures, thus letting some of the resin strands extruded through the apertures have different densities by controlling the amount of resin passing therethrough.

One method of obtaining an elongated article having a quasi "annual ring" structure as seen in natural wood is to give a high expanding capability to individual resin strands extruded through the apertures of die, and to maintain the space volume wherein said strands are allowed to expand as less than the volume which said strands would take if said strands were allowed to expand freely. Thus, when a number of resin strands are coalesced to form an elongated article, individual strands are constricted by adjacent strands and accordingly, the space into which the individual strands are allowed to expand is restricted. When the expanding capacity of the resin strand is designed to be larger and the volume of the spaces in to which they are allowed to expand is restricted, each individual strand expands to have low density in its center portion and to have high density in its outer portion. When a number of said strands are coalesced to form an elongated article, said article will have both highly expanded (and accordingly lower density) portions and less expanded (and accordingly higher density) portions therein which extend in a longitudinal direction and coexist in a mixed state, and when seen in cross section, the article will have a structure comprising alternate higher density portions and lower density portions wherein said higher density portions constitute the frame distributed in a reticulate form, in which lower density portions are filled. Such a structure is one of the requirements for imparting properties to the article which are similar to those of natural wood.

Another way for obtaining an elongated article having a quasi-annual-ring structure is to create differences in density between individual strands, i.e., interstrand density differences, by employing a specific die, wherein the apertures are varied in their sizes, lengths of lands, shapes, and distributions. In this way, density differences between the strands are determined by the structure of said die.

Figure 2:
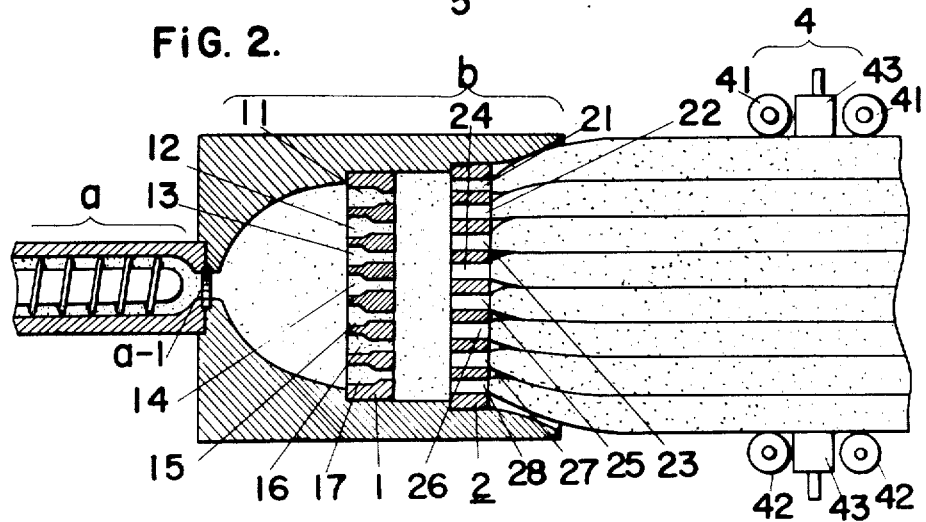
FIG. 2 is a schematic cross-sectional view of one embodiment of the invention.

In FIG. 2, character reference a denotes an extruder, character reference b denotes a die and character reference a-1 denotes a breaker plate mounted at discharge end of the extruder. The die shown in FIG. 2 is provided with two plates 1 and 2 in middle and rear respectively, each plate having a number of apertures. Plates 1 and 2 are positioned at areas where the passage is enlarged substantially corresponding to a desired cross-sectional area. Plate 1 has a plurality of apertures (those shown being designated 11–17) uniformly distributed across the face of the plate and these apetures have the same inlet and outlet diameters. The plate 2 also has a plurality of uniformly distributed apertures (those shown being designated 21–28) and these apertures all have the same size. The diameters of the apertures in the plate 1 can be enlarged at the resin inlet side or resin outlet side. The land length of the enlarged portion is the largest in the paerture 11 and decreases gracually towards the center, accordingly the smallest is the aperture 14. On the other hand, the apertures in plate 2 have the same diameter throughout their lengths.

Figure 3:
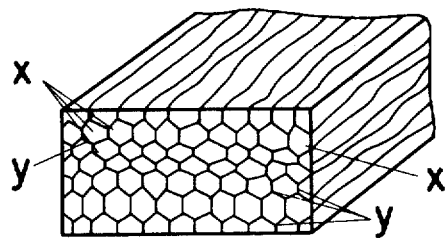
FIG. 3 is a perspective view of a synthetic wood obtained by using the die as shown in FIG. 2.

When a die b having the structure as shown in FIG. 2 is employed in carrying out the invention, the resin extruded from the extruder a advances into the die b and passes plate 1. When the resin passes through aperture 11 of plate 1, since the land length of the enlarged portion is greater than than of aperture 14, the resin advances easily through aperture 11 compared with through aperture 14. Thus, after resin has passed through plate 1, the pressure loss of the resin is less in the vicinity of aperture 11 than in the vicinity of aperture 14, as compared with before the resin passes through plate 1. If the pressure on the resin is greater in the center portion than in the peripheral portion, it is possible, due to the presence of plate 1, to adjust the pressure of the resin so that it is substantially the same in the center and peripheral portions. As mentioned above, since plate 2 has apertures of the same size uniformly distributed, the resin is extruded through the apertures of plate 2 under substantially the same pressure, therefore, the resin strands extruded through plate 2 are equalized. After extrusion through plate 2, the strands are expanded in a space which is restricted in volume, therefore all strands form high density portions on their outer surfaces. FIG. 3 shows a typical synthetic wood obtained by using the die as shown in FIG. 2.

As shown in FIG. 3, almost all strands are equally expanded, however, each of the individual strands has a higher density portion y and a lower density portion x. In addition, each strand is adhered to an adjacent strand to form a perfect unitary article. Thus, the obtained article, as shown in FIG. 3, has lower density portions and higher density portions therein, both extending throughout the length of article, and as seen in the cross section, the inner high density portions constitute aframework which surrounds the lower density portion. However, in such an article the individual strands have expanded to substantially the same degree and each strand has a small cross-sectional area and accordingly, the article as a whole can be seen as uniformly expanded.

Figure 4:
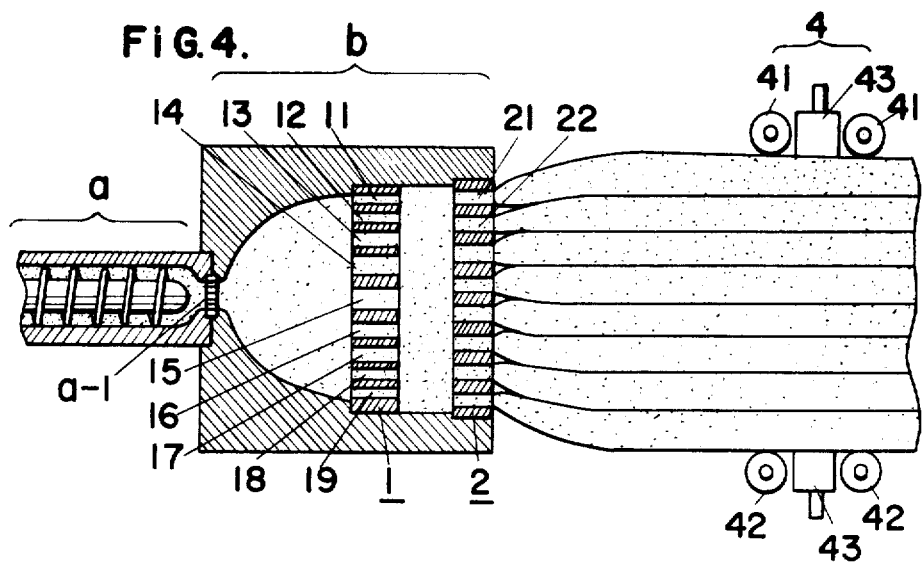
FIG. 4 is a schematic cross-sectional view of another embodiment wherein a modified die is employed.

FIG. 4 illustrates another embodiment of the invention wherein a modified die is employed. The die shown in FIG. 4 is similar to that of FIG. 2 in that it is provided with two plates 1 and 2, and plate 2 has uniformly distributed apertures of equal size. However, the die of FIG. 4 is different from that of FIG. 2 in that plate 1 of FIG. 4 has apertures 11–19 (and others) of different diameters and each of the apertures respectively has the same diameter throughout its land length without an enlarged portion, and also in that plate 1 of FIG. 4 has larger diameter apertures 14, 15, 16 in the center portion and smaller diameter apertures 11, 19 in the peripheral portion.

Figure 5:
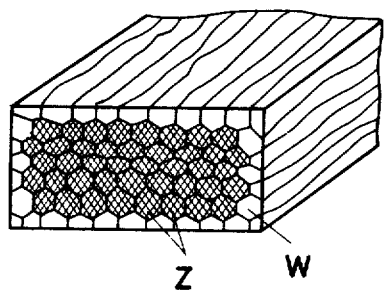
FIG. 5 is a perspective view of a synthetic wood obtained by using the die shown in FIG. 4.

FIG. 5 shows a synthetic wood obtained when using the die b of FIG. 4. A microporous elongated article is obtained which is constituted from a number of coalesced strands, each strand having higher density at its outer portion and having lower density at its inner portion, and the strands located at the outer portion of the article have lower density while the strands locating at the inner portion have higher density as ween in cross section. This is due to the fact that the apertures of the center portion have larger diameters than those of the peripheral portion in plate 1, and the pressure on the resin of the center portion is greater than that of the peripheral portion in the passage whereby the amount of the resin passing through the center portion is larger than that passing through the peripheral portion of the plate 2. As a result, when the process is carried out by the use of die b as shown in FIG. 4, a microporous article as shown in FIG. 5 is obtained, in which higher density expanded strands Z are disposed in the inner portion and lower density expanded strands W are disposed in the outer portion.

Figure 6:
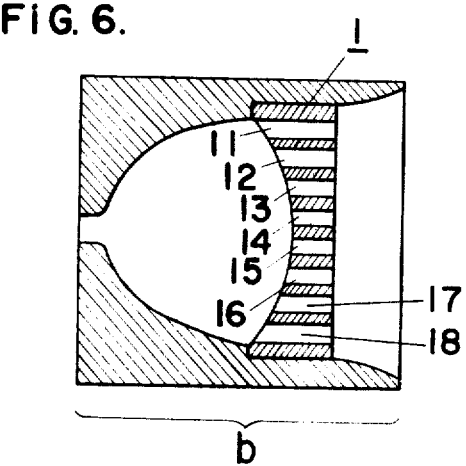
FIG. 6 is a schematic cross-sectional view of a further embodiment wherein a further modified die is employed.

FIG. 6 shows a further embodiment of the invention wherein a modified die is employed. The die of FIG. 6 has only one plate 1 in the passage of the resin, therefore, the apertures 11–18 (and others) are arranged in a single stage column. As shown in FIG. 6, plate 1 is thinner in the center portion. With the construction of plate 1 as mentioned above, when plate 1 is provided with apertures at uniformly spaced points, the length of the apertures is shorter in the center portion and longer in the peripheral of the plate.

When the process is carried out by use of the die as shown in FIG. 6, since the lengths of the apertures 14, 15, etc. in the center portion are shorter and those of apertures 11, 18, etc. in the peripheral portion are longer, movement of the resin through the center portion is easier than through the peripheral portion. Accordingly, when a number of resin strands extruded through the die are coalesced together, a microporous elongated article can be obtained which includes lower expanded strands disposed in the center portion and higher expanded strands disposed in the peripheral portion, by the same reason as mentioned in connection with the die of FIG. 4.

The foregoing description of the die has been made in connection with dies having a number of apertures formed therein. The same operative effects may be obtained by the use of dies having a number of small slits formed therein and accordingly, in the present invention the small slits serve in somewhat the same way as the apertures.

The dies shown in FIGS. 2, 4 and 6 are only exemplary of dies suitable for the invention. The dies to be employed in the present invention are not limited to those specifically shown and described herein and accordingly, variations and combinations of the shown dies can be, of course, employed within the scope of the invention.

Another way to impart a quasi annual ring structure, similar to an annual ring structure of natural wood, to a microporous elongated article which has been formed by extruding resin into a number of strands and coalescing the strands together is to enlarge the cross-sectional area at the discharge end of individual apertures as compared to the inlet end of said apertures so that the resin is first formed into a number of strands at the inlet end of the individual apertures and then partially expanded at the inlet of the enlarged portion of the apertures, and the outer surfaces of the strands are kept in contact with the walls of the enlarged portions while passing through said enlarged portions of the apertures.

Figure 7:
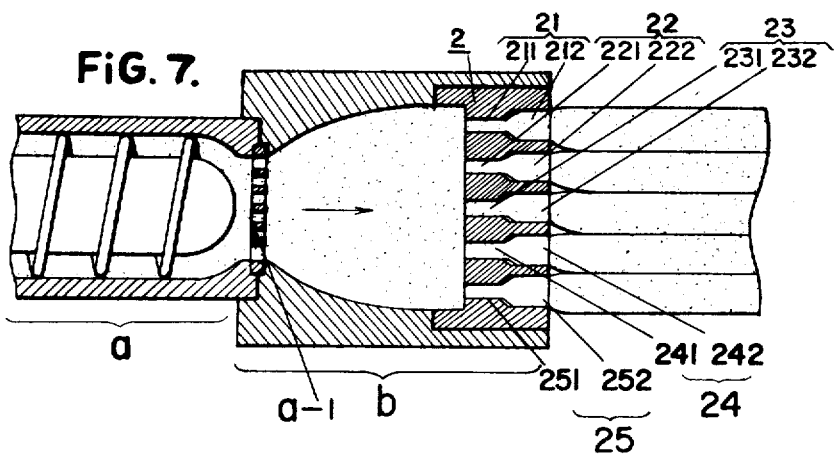
FIG. 7 is a schematic view in cross-section of the construction of still another modified die to be employed together with an extruder.
Figure 13:
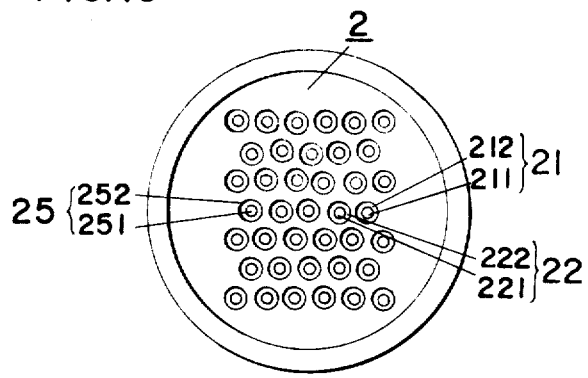
FIG. 13 is a front view taken from the discharge side of the die shown schematically in FIG. 7.

In FIGS. 7 and 13 which illustrate the construction of a further modified die a denotes an extruder and b denotes a die into which resin is fed through breaker plate a-1 under pressure and the resin advances in the arrow direction. The resin passage within die b gradually increases its cross-sectional area towards the discharge end where the cross-sectional area has a desired configuration. At the discharge end of the passage is mounted plate 2 having a number of apertures 21 – 25 etc. distributed over the desired cross-sectional area. The inlet sides 211, 221, 231, etc. of these apertures 21, 22, 23, etc. have smaller cross-sectional area and remain non-enlarged and the discharge sides 212, 222, 232, etc. of the apertures are enlarged and have larger cross-sectional areas.

When the invention is carried out by the use of a die such as that shown in FIG. 7, the resin is first formed into a number of strands at the smaller diameter portions 211, 221, 231, etc. and since the resin contains expanding agents, the strands are caused to partially expand upon reaching enlarged diameter portions 212, 222, 232. As the partially expanded strands pass through the enlarged diameter portions 212, 222, 232, with their outer surfaces in contact with the walls of the enlarged diameter portions 212, 222, 232, the strands are caused to expand. The strands thus obtained have outer surfaces which are less expanded and have higher densities. Accordingly, when a microporous elongated article is formed by coalescing these strands together, each of the strands has different density portions, the outer surfaces having higher densities and the inner portions lower densities, which extend in the longitudinal direction, and such a structure resembles annual rings and shows good properties similar to those of natural wood.

In the foregoing, it has been described that the resin is formed into a number of strands at smaller diameter portions 211, 221, 231, and caused to partially expand at enlarged portions 212, 222, 232, thereafter, the strands advance with their outer surfaces in contact with the walls of enlarged portions 212, 222, 232. However, in fact, since the above phenomenon cannot be visually observed, the actual phenomenon cannot be made clear. And therefore, above phenomenon may be more truly said to be an assumption. In any event, the result is clear, and when a die as shown in FIG. 7 is used in carrying out the process, a microporous article having different foam densities or differently expanded portions can be obtained.

The dies to be employed in the present invention are by no means limited to those having apertures 21, 22, 23 etc. as shown in FIG. 7. For example, the die having plate 2 in which apertures 21, 22, 23, are formed as shown in FIGS. 8 through 12 may with equal effectiveness be employed, and those shown in these Figs. produce similar effects to those obtainable by the die of FIG. 7.

Figure 8:
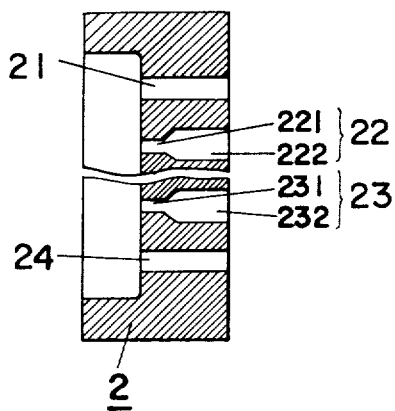
FIGS. 8 through 12 are partial schematic views in cross-section of plates which can be mounted at the discharge end of the die in place of plate 2 of FIG. 7.
Figure 9:
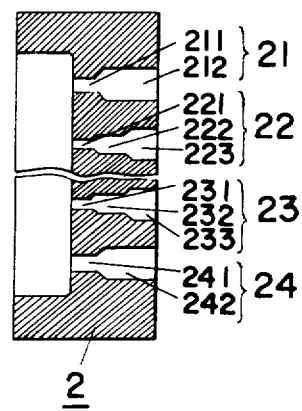
Figure 10:
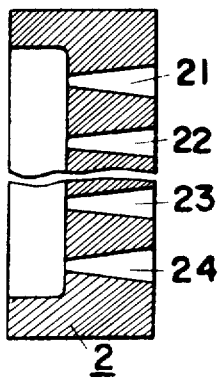
Figure 11:
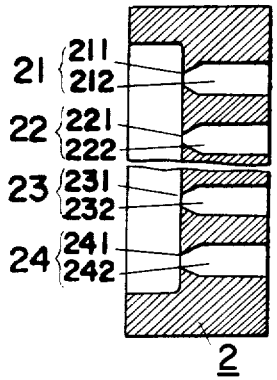
Figure 12:
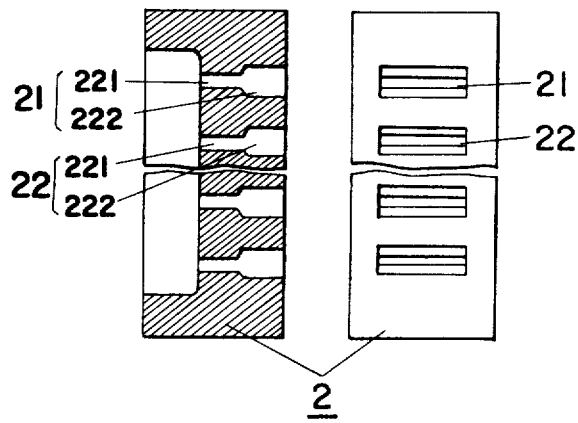

In FIG. 8, there is shown a plate which includes peripheral apertures 21, 24 having no enlarged portions and center apertures 22, 23 having enlarged portions 222, 232. In FIG. 9 there is shown a plate which includes peripheral apertures 21, 24 being single-stage enlarged and having both non-enlarged portions 211, 241 and enlarged portions 212, 242. The center apertures 22, 23 are enlarged in two stages and have non-enlarged portions 221, 231, enlarged portions 222, 232 and further enlarged portions 223, 233. In FIG. 10, there is shown a plate which has apertures 21, 22 the diameters of which increase gradually as they advance, wherein there is no apparent line dividing between non-enlarged portion and enlarged portion. In FIG. 11, there is shown a plate which has apertures wherein the land lengths of non-enlarged portions 211, 221, 231 are shorter than those of enlarged portions 212, 222, 232. Finally, in FIG. 12 there is shown a plate which is similar to that of FIG. 7, but provided with small slits instead of circular apertures.

In order to coalesce together the resin strands which have been extruded through apertures of a die, it is preferable to provide a plurality of paired rolls which can rotate in advancing direction of the strands in the vicinity of the passage of the strands where the strands are allowed to freely expand and the temperature of outer portions of the strands is approaching the softening point of the resin, and to coalesce the strands together by said rolls. In other words, the rolls are preferably so designed that when the strands advance between the paired rolls the strands are nipped and compressed by the rolls from above and below, also right and left, but the rolls themselves are not positively driven but rotate by their frictional contact with the advancing strands.

The coalescing means for the strands referred to above is shown for example in FIG. 2, where a plurality of paired rolls 4 are provided in a position where each of the resin strands extruded through die b are allowed to expand while being restricted by adjacent strands, and where the surface temperature of the resin has dropped below its softening point.

Figure 14:
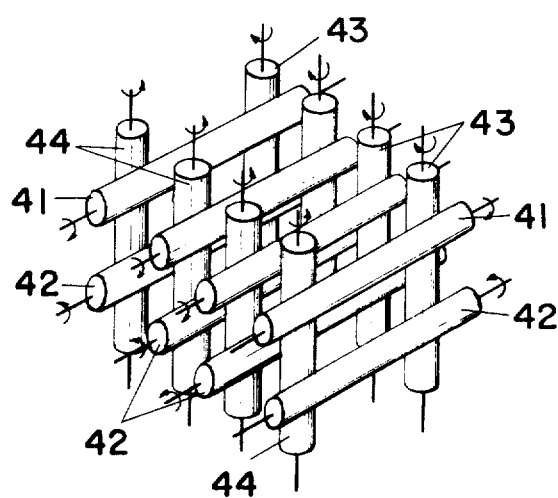
FIG. 14 is a perspective view of plurality of paired rolls.

FIG. 14 shows a plurality of paired rolls. In FIG. 14, all these rolls 4 are arranged to be paired, rolls 41 and 42 providing horizontally disposed pairs, and rolls 43 and 44 providing vertically disposed pairs. The resin strands advance between the plural paired rolls in succession. The distance between the paired rolls can be adjusted so that they may apply a slight pressure against the outer strands, and they are not positively driven but rotate through their contact with the advancing strands. When slightly compressed by the paired rolls, since the resin strands are still maintained at an elevated temperature in the vicinity of the softening point of the resin strands, the strands are coalesced together to form a unitary article.

In the process mentioned above, since the outer surface of resin strands located at the outer part of the finished article is cooled to have a temperature in the vicinity of the softening point of the resin at the position where the rolls 41, 42, 43 and 44 contact the said resin strands, there is less possibility that the pores formed in the strands are destroyed or deformed by the pressure applied thereon by the contacting rolls. And moreover, since the inner portions of the resin strands have a temperature above the softening point of the resin, the strands can be coalesced together in their surfaces while they are still in a softened state sufficient to adhere to one another. In addition, since the rolls are not positively driven but rotated through their contact with the advancing strands, there is less the possibility that the pores formed in the strands may be destroyed or deformed. Furthermore, since the resin strands are coalesced between the rolls rotating in the opposite directions, the surface of the strands can be effectively smoothed and the inner strands may be provided with sharp edges.

When a synthetic wood is to be formed, it is preferable to form the resin strands in such sizes that each of said strands may appear to be an annual ring in the finished article which is produced by coalescing said strands after expansion. For practical purpose, it is preferable to impart each strand with a cross-sectional area between 0.005 cm$^2$ and 1.0 cm$^2$ after expansion. The cross-sectional shape of the strand may be circular, oval, square, rectangular, polygonal, or any other arbitrary shape.

In the synthetic wood produced by the invention, it is necessary that each of the resin strands which has passed through an aperture in a die have a higher density at its outer surface and a lower density in its inner portion. Since each strand sometimes has a density gradient increasing continuously from the inner portion to the outer portion, and normally has a cross-sectional area less than 1 cm$^2$, it may be difficult to distinguish definitely the inner portion from the outer portion. Accordingly, it is generally difficult to define the difference in density between the inner and outer portions by means of a definite absolute value. However, as seen in cross-section, it is apparent that the outer portion of each strand has a higher density and contains a relatively lesser number of micropores, and that the inner portion has a low density and contains relatively a larger number of micropores. In particular, when the extruded resin strands contain pigments or other coloring agents, the lesser expanded (i.e., denser) portions generally exhibit a darker color, while the more highly expanded (low density) portions exhibit a ligher color. In the synthetic wood of the invention, if pigments are added to the resin, the outer portion of each strand is imparted with a darker color while the inner portion of said strand is imparted with a lighter colour, thus these portions can be clearly discerned from one another. Besides, in the synthetic wood produced by the invention, the individual strands constituting said synthetic wood have different expanding degrees and the difference in density between the individual strands can be defined in the following way.

Taking the average density of a single resin strand as B, and the average density of the whole synthetic wood comprising a number of resin strands as A, it is preferable that average density B is at least 0.2 × A. Since the average density A has a value between 0.1 and 0.7 g/cc, the average density B should be more than 0.02 g/cc. When all strands are classified by the relationship between average density B and average density A, they should be divided into the following three groups; lower density strands, intermediate density strands and higher density strands. The lower density strands have densities in the range 0.2A ≦ B<0.95A, the intermediate density strands have densities in the range 0.95A ≦ B ≦ 1.05A, and the higher density strands have densities in the range 1.05A<B ≦ 1.00. Thus, it is preferable that the volume of the intermediate density strands account for less than 30% of the total synthetic wood, and also that the volume of the sum of the lower density strands and higher density strands accounts for more than 10% of that of the whole synthetic wood, respectively. In other words, it is preferable that the higher density strands and lower density strands account for more than 10% in volume. Furthermore, it is preferable that the difference between average density of the higher density strands and that of the lower density strands be more than 0.1 g/cc. In other words, it is preferable that the density difference between the higher density strands and lower density strands be greater than a specific value. A mocroporous article coalescing the expanded strands which satisfies the above requirements is particularly suitable to be used as a synthetic wood. The above requirements have been experimentally confirmed as necessary factors in successfully carrying out the invention.

An example of a specific synthetic wood used for the manufacture of furniture can be described as follows. In the synthetic wood used for the manufacture of furniture, it is desirable to use resin strands expanded about 2 to 4 times in volume as the higher density strands, and resin strands expanded about 5 to 15 times in volume as the lower density strands, and also that said higher density strands and lower density strands account for 15 to 20% in volume of the synthetic wood. The resultant synthetic wood is particularly suitable for use in furniture.

As stated above, although it is desirable to have the resin strands expanded in different amounts, it is also possible that some of the resin strands may have the same degree of expansion. However, it is desirable that differently expanded strands are interposed between equally expanded strands. Thus, there can be various embodiments in the arrangement of the resin strands which have different degrees of expansion. One embodiment is that the higher density strands and lower density strands are alternately arranged in a regular fashion; however, such a regular arrangement is not always necessary. Instead, the arrangement in which some strands of identical degree of expansion are disposed adjacent to one another and the remaining ones of the identical degree of expansion are separated by strands having different expansion degrees is also within the scope of the invention.

Various arrangements of the strands which are useful in carrying out this process are described hereinbelow referring to FIGS. 15 to 18 of the accompanying drawings which show arrangements of resin strands having different expanded densities.

Figure 15:
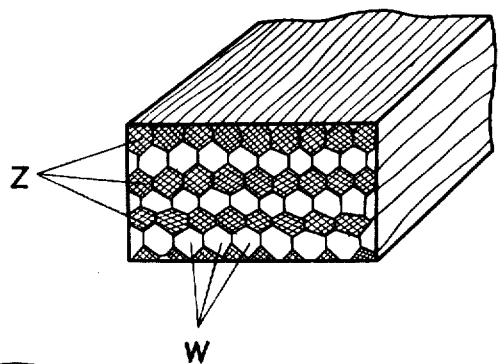
FIGS. 15 through 18 are perspective views of synthetic wood which show arrangements of resin strands having different expanded densities.

In FIG. 15, the higher density strands Z, (i.e., less expanded) are in succession in a horizontal direction to form a higher density layer, and the lower density strands W, (i.e., high expanded) are also in succession in a horizontal direction to form a low density layer; the higher density layers and said lower density layers are alternately arranged in a regular fashion in the vertical direction.

Figure 16:
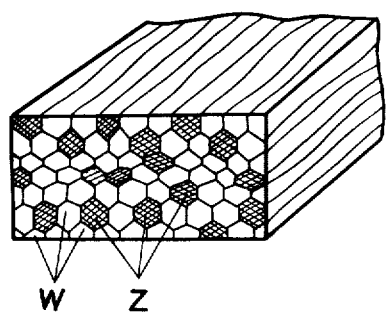

In FIG. 16, the higher density strands Z and the lower density strands W are randomly arranged.

Figure 17:
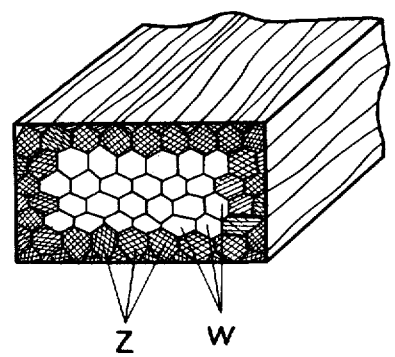

In FIG. 17, the higher density strands Z are in succession to form two layers in the outer surface and the lower density strands W are concentrated in the inner portion.

Figure 18:
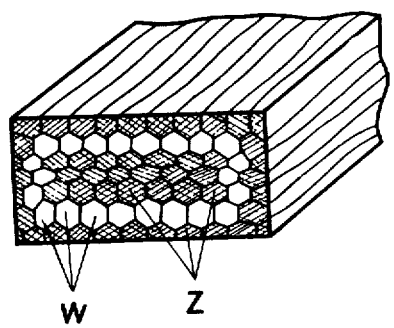

In FIG. 18, some of the higher density strands Z form outer layers, the rest of the higher density strands form inner block, and the lower density strands are disposed between said outer layers and said inner block.

According to the present invention, the addition of coloring agents, flame retardants and the like to the resin is contemplated. In addition, for the purpose of improvement of the strength of the obtained synthetic wood, synthetic fibers and/or glass fibers may be contained in the resin strands. And for the purpose of weight increase, fillers may be added thereto.

Since the synthetic wood of the invention comprises a number of expanded resin strands, each having high density surface and low density inner portion, coalesced one to another on their higher density surfaces to form a unitary structure, the product has a great resistance against bending in the longitudinal direction and has a relatively light weight. Accordingly, the synthetic wood is characterized by its rigidity and light weight. Since the synthetic wood is microporous, it also has a good heat insulation property. Furthermore, since the adjacent resin strands in the synthetic wood are coalesced together, the junctures between adjacent strands provide an appearance similar to the annual ring of natural wood, and said junctures extend in the longitudinal direction of the synthetic wood similar to a straight grain structure without the presence of knots as seen in natural wood; a fine appearance is therefore characteristic of the synthetic wood. The properties of the synthetic wood of the invention do not change even when subject to saw shearing and planing, and pieces of such synthetic wood can be secured together by nailing.

The fact that the synthetic wood of the invention can be very satisfactorily nailed will be manifested as follows: For natural wood, nail pulling off test can be performed by JIS-Z-2121 procedure, where the nail is pulled off the tested material. According to the experimental procedure, when an iron nail having a length of 45 mm and diameter of 2.41 mm is driven into a piece of cryptomeria wood to a depth of 15 mm in a direction perpendicular to the face of the piece, the force required to pull the nail off the wood piece is within the range 10 to 25 Kg. On the other hand, for conventional synthetic wood, when the degree of expansion of the resin is not generally limited to 2 to 3 times, it is impossible to maintain the pulling force at 10 Kg. When the degree of expansion of the resin is more than 2 to 3 times, the pulling force is smaller than 10 Kg. However, in the synthetic wood of this invention, even when the average degree of expansion is increased to 4.2 to 4.7 times, the nail pulling-off force may be increased to 13 Kg. In this way, the nail pulling-off force is comparatively large in spite of such a large degree of expansion and accordingly, the synthetic wood of the invention has been demonstrated as being capable of being secured by nailing.

The invention is further illustrated with reference to the following nonlimiting examples, being merely illustrative of the invention.

Example 1

100 weight parts of granular polystyrene containing about 4 weight % of butane (diameter range of 2–3 mm) was prepared. 0.5 weight part of sodium bicarbonate, 0.3 weight part of citric acid and 3 weight parts of fine powdery clay were added to the polystyrene. The resultant mixture was intimately mixed and charged into an extruder having an internal diameter of 50 mm. The material obtained was capable of expansion to about 20 times in volume when extruded through a die having a single aperture and expanded into a free space.

The apparatus used in this example was a modified one shown in FIG. 2. Die $b$ mounted on the extruder a had the following dimensions: Plate 1 is a rectangular plate having a long side of 150 mm and a short side of 20 mm in the portion where it comes into contact with molten resin, and it has a thickness of 30 mm. Over the entire surface of plate 1 are perforated 44 apertures extending through the direction of the thickness. Among the apertures, 30 apertures are distributed in a latticed form in two rows 10 mm apart with each aperture in a row being spaced 10 mm from its neighbor, and at every center of area surrounded by four adjacent apertures are distributed one by one the remaining 14 apertures. The apertures have a diameter of 4.4 mm at the resin outlet side. Among them, the apertures disposed in the vicinity of the short sides of plate 1 are provided with enlarged portions having a diameter of 6.0 mm at the resin inlet side. The depths of the enlarged portions are 20 mm with respect to three apertures disposed in position nearest to said short sides, and 18 mm with respect to three apertures adjacent to said first three apertures, and then 6 mm, 4 mm, 2 mm in order with respect to every three apertures, and finally, the apertures at the center portion of plate 1 have no enlarged portion.

Plate 2 has the same dimensions as plate 1 in the long and short side, and a thickness of 20 mm. Over all, the surface of plate 2 is perforated with 329 apertures each having a diameter of 1.6 mm in the direction of the thickness of plate 2. Among them, 185 apertures are distributed in a lattice form in five rows of 37 apertures in each row, the rows being separated by distances of approximately 4 mm in the direction of the short side and each aperture in the row is spaced approximately 4 mm apart in the direction of the long side. The remaining 144 apertures are distributed one by one at every center of area surrounded by four adjacent apertures.

The temperature of the extruder was maintained at 150°–200°C, and said mixture was extruded through said die. The resin strands extruded through said die were compressed together between a die frame while they were still in a softened state into a microporous board having a thickness of 25 mm and a width of 180 mm.

The resulting board had an average density of 0.103 g/cc as a whole. All individual strands constituting said board had higher densities in the surface portions compared with the inner portions thereof.

Then, in order to investigate the degree and distribution of expansion, said article was divided into every strand, and regarding every strand, weight and volume were measured. The average densities of individual strands were within the range of 0.086 to 0.218 g/cc. The cross-sectional areas of said individual strands were within the range of 0.21 cm$^2$ to 0.08 cm$^2$.

Based upon these results, all strands were classified into the following three groups:

1. lower density strands, i.e., strands having densities of 0.086 to 0.097 g/cc
2. intermediate density strands i.e., strands having densities of 0.097 to 0.108 g/cc (since the whole board had an average density of 0.103 × 0.95 to 0.103 × 1.05), and
3. higher density strands, i.e., strands having densities of 0.108 to 0.218 g/cc Deviations in density among all strands were investigated. The results were as follows:

| Classification of Strands | Numbers of Strands | Volume ratios (%) | Average Densities (g/cc) |
|---|---|---|---|
| lower density strands | 30 | 9.1 | 0.092 |
| intermediate density strands | 287 | 87.3 | 0.103 |
| higher density strands | 12 | 3.6 | 0.179 |

It was confirmed that the article had good properties, but not as excellent as compared with those of the following examples because of fewer deviations in density.

The values determined above were obtained as follows. A test specimen having a thickness of 10 mm was prepared by cutting said board in the direction perpendicular to the longitudinal direction. The weight and volume of the test specimen was measured, and based on the measured values the density was calculated which was assumed to be the average density of the board. The specimen was then cut into individual strands, and the weight and volume of the individual strands were measured. The densities of the individual strands were calculated from above measured values. Basing upon the densities of the individual strands, these strands were classified into lower density strands, intermediate density strands and higher density strands; then the numbers of strands, volume ratios and average densities were calculated. This test was conducted by preparing three test specimens from arbitrary portions of the board and by taking the average value from measured values regarding every specimen. This procedure was also used in the following examples.

The board had a surface hardness of 5–8 by means of Type-D Durometer according to ASTM D 2240-64T. A nail pulling-off test was conducted by driving an iron nail having 45 mm in length and 2.41 mm in diameter from the surface in the direction perpendicular to the longitudinal direction of the board to a depth of 15 mm and by measuring the maximum load required to pull out the nail, whereby said load was 1.3 Kg. The surface hardness was taken as an average of tests conducted on ten random points of the board, and the load in the nail pulling-off test was also an average value when the nail pulling-off tests where conducted on five points randomly selected points. This procedure was also used in the following examples.

The microporous board obtained in this example had a fine appearance and good properties similar to a straight grain structure of natural wood, and could be employed for contruction material.

Example 2

Figure 19:
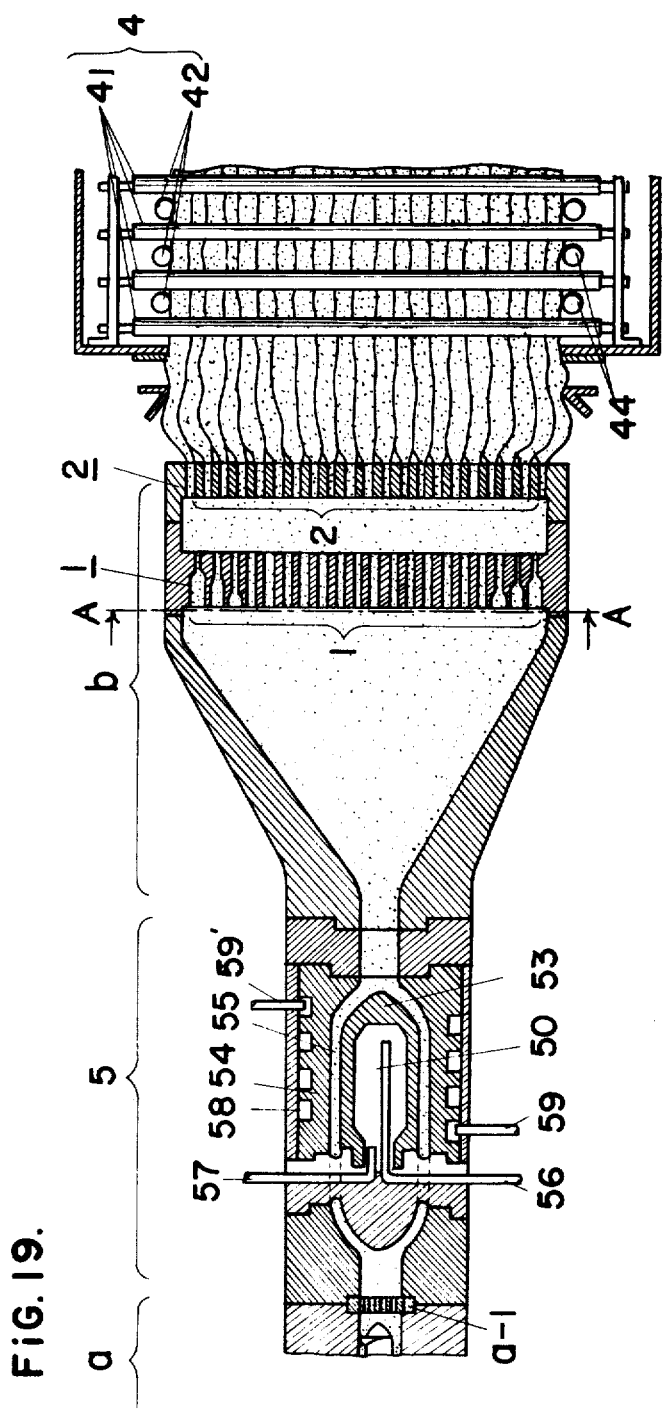
FIG. 19 is a schematic cross-sectional view of the very preferred apparatus described in Example 2.
Figure 20:
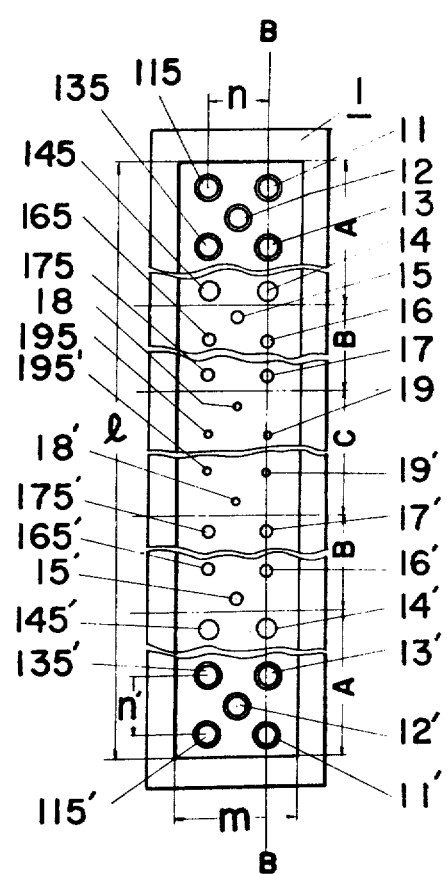
FIG. 20 is an enlarged view of plate 1 taken along the line A—A of FIG. 19.
Figure 21:
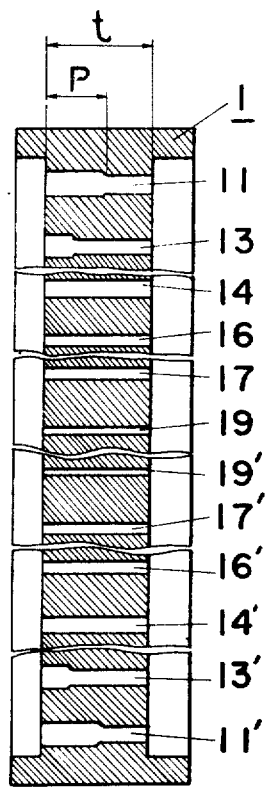
FIG. 21 is a cross-sectional view taken along the line B—B of FIG. 20.

In this example, the apparatus shown in FIGS. 19 through 21 are employed. In FIG. 19, character a denotes an extruder, character b denotes a die, and numeral 3 denotes a temperature regulator as shown in FIG. 1. Notably, the apparatus of FIG. 19 has been found to perform most preferably in accordance with the objectives of the invention.

In this example, 28 Kg of granular polystyrene containing 6.0 weight % of butane was mixed with 55 Kg of granular polystyrene containing no expanding agent, and to the mixture was adhered uniformly 160 g of polybutene having an average molecular weight of 470 and low viscosity. To the thereby obtained mixture were added 2.4 Kg of fine powdery talc having 10–13 micron in diameters and 160 g of brown pigment. This mixture was employed as a raw material after it had been intimately blended. The raw material was capable of expansion to about 8 times in volume when extruded through a die having a single aperture and expanded into a free space.

Regarding the extruder, two extruders having 50 mm and 65 mm diameters, respectively, are connected in series, and the former was rotated 60 r.p.m., the latter 42 r.p.m. whereby the material was extruded at the rate of 32 Kg/hr.

On die b was mounted plates 1 and 2 as in Example 1.

Plate 1 is a rectangular plate as shown in FIGS. 20 and 21. Plate 1 has a long side l of 6–5 mm, a short side m of 22 mm in the position where it contacts with molten resin, and a thickness of 50 mm. Over the entire surface of plate 1 are perforated 182 apertures 11, 12,...12', 11' extending through the direction of the thickness. 122 apertures 11, 115, 13, 135, 14, 16 ... are distributed in a latticed form wherein the distance $n'$ in the direction of long side 1 and the distance $n$ in the direction of short side $m$ are all 10 mm. Further 60 apertures such as 12, 15, 18, are distributed one by one at every center of area surrounded by four adjacent apertures for example 11, 115, 135, 13; 14, 145, 165, 16;... (hereinafter this distribution of apertures is referred to as double zigzag distribution of distance $n \times n'$). The diameters of these apertures 11, 115, 12 ..... are as follows. Plate 1 is divided into five parts along the long side 1, and the divided parts are referred to as A, B, C in order of position from both sides. Part A has a length of 105.5 mm along long side 1, B the length of 100 mm, C the length of 195 mm. Part A has 64 apertures, 11, 115, 12, ... and 11', 12' ..., the diameters of which are all 5 mm. Part B has 60 apertures, 15, 16 ..., and 15', 16' ..., the diameters of which are all 4.8 mm. Part C has 58 apertures, 18, 19, 195, 18', 19' ..., the diameters of which are all 4.6 mm.

Among the apertures perforated in part A, apertures 11, 115, 12 ... and 11', 115', 12', disposed in the vicinity of short sides m are provided with enlarged portions having a diameter of 6 mm at the resin inlet side. Depths $p$ of said enlarged portions are 20 mm with respect to three apertures 11, 111, 12; 11', 111', 12', disposed in the position nearest to short sides $n$, and 15 mm with respect to three apertures adjacent to said three apertures, and then 10 mm, 8 mm, 6 mm in order with respect to every three apertures, at last the apertures 14, 14' positioned close to the center have no enlarged portion p.

Referring to the perforated plate 2 shown in FIG. 19, it is a rectangular plate having the same dimensions as plate 1 in the long and short side in the portion where it contacts with molten resin, and having the thickness of 20 mm. Over the entire surface of plate 2 are perforated 1085 apertures having the diameter of 1.6 mm extending through the direction of the thickness. The distribution of said apertures is double zigzag distribution of distance $5 \times 5$ according to the definition mentioned above.

The apparatus used in this example had a temperature regulator 5 as shown in FIG. 1 between extruder a and die b. By means of said temperature regulator 5 wherein heated oil was circulated, resin was maintained within a certain temperature range and was extruded through die b into a number of strands.

Extruded resin strands were passed through frame 3 while they were still in a softened state, and they were compressed to be coalesced by said frame 3, and then they were completely coalesced by means of a plurality of paired rolls 4.

The plurality of paired rolls comprised eight rolls 42 and 44 in both right and left sides, said rolls being 10 mm in diameter and having their axes in the vertical direction, and nine rolls 41 and 43 in both upper and lower sides, said rolls being 25 mm in diameter and having their axes in the horizontal direction. The cross-sectional area surrounded by said paired rolls was $20 \times 600$ mm.

Expanded resin strands passing through said paired rolls 4 were cooled by water, then pulled off by being nipped through a pair of rubber rolls and thus formed into an elongated article.

The article thus obtained was a board having 20 mm in thickness and 600 mm in width. Individual strands constituting said article had the inner portions expanded to a high degree (lower densities) and the outer portions expanded to a low degree (high densities). The higher density outer portions of adjacent strands were coalesced firmly together. Moreover, since said coalesced outer surfaces extended through the longitudinal direction, the article had fine appearance and properties similar to a straight grain structure of natural wood.

Various measurements were conducted on the board thus obtained, and the results were as follows.

Average density of the board as a whole was 0.238 g/cc (expanding ratio about 4.2). Then, the board was divided into every strand, and regarding every strand, weight and volume were measured. The cross-sectional areas of individual resin strands constituting the board were in the range of 0.056 to 0.860 cm². The densities of the individual strands were in the range of 0.181 to 0.295 g/cc. Summarizing these results, and all strands were classified into three groups according to their densities, i.e. lower density strands having the density of 0.181 to 0.225 g/cc, intermediate density strands having the density of 0.226 to 0.250 g/cc and higher density strands having the density of 0.251 to 0.295 g/cc. The results were as follows.

| Classification of Strands | Numbers of strands | Volume ratios (%) | Average densities (g/cc) |
| --- | --- | --- | --- |
| lower density strands | 99 | 9.1 | 0.208 |
| intermediate density strands | 841 | 77.5 | 0.236 |
| higher density strands | 145 | 13.4 | 0.270 |

It was confirmed that the article had excellent properties as mentioned below, because of rather broad deviations in density.

The board had a fine appearance and good properties similar to the straight grain structure of natural wood, and could be employed in the same way as natural wood, since it could be planed or cut by saw. The board had a surface hardness of 14–20 when measured by the testing method described in Example 1. The board had a nail pulling-off strength of 8.0 Kg when measured by the method described in Example 1. Said nail pulling-off strength was superior to all conventional microporous resin woods having the same density.

Example 3

In this example, the raw materials and apparatus was the same as in Example 2. However, the die used in this example was different from that of Example 2 both in the numbers of apertures perforated in plate 1 of die b and in the distribution of said apertures.

Plate 1 used in this example was identical with the rectangular dimensions, thickness and the diameter of apertures perforated therein. However, plage 1 had 1577 apertures, distribution of which was that 984 apertures are arranged in double lines in the peripheral portion at a distance of 2.5 mm along both short and long sides, and the remaining 593 apertures are arranged in the center portion in a double zigzag distribution of 5 × 5.

Using the die having said plate 1, a microporous board having 600 mm in width and 20 mm in thickness was obtained in the same way as in Example 2.

The board thus obtained was tested in the same way as in Example 1, and the results obtained were as follows.

The board had an average density of 0.244 g/cc. The individual strands constituting said board had higher densities in outer portions and lower densities in inner portions, and the cross-sectional areas of the strands were within the range of 0.006 to 0.518 cm². Said strands had the average densities within the range of 0.151 to 0.330 g/cc. Said strands are classified into following three groups in the same way as in the preceding Examples.

1. lower density strands having 0.151 to 0.231 g/cc in density
2. intermediate density strands having 0.232 to 0.256 g/cc in density, and
3. higher density strands having 0.257 to 0.330 g/cc in density.

The results were as follows:

| Classification of Strands | Number of Strands | Volume ratios (%) | Average Densities (g/cc) |
| --- | --- | --- | --- |
| lower density strands | 593 | 40.4 | 0.189 |
| intermediate density strands | 375 | 18.2 | 0.238 |
| higher density strands | 609 | 41.4 | 0.299 |

It was confirmed that the article had quite excellent properties as mentioned below, because of further broad deviations in density.

The board had the structure as shown in FIG. 17, in which the higher density strands were concentrated in the outer portion of the board. The board had a surface hardness of 24–35 and a nail pulling-off strength of 10.2 Kg when tested in the same way as in Example 1. The other properties measured by the conventional method were as follows.

compressive strength (direction of thickness) 20 Kg/cm² compressive strength (longitudinal direction) 93 Kg/cm² tensile strength (longitudinal direction) 55 Kg/cm² bending strength (longitudinal direction) 120 Kg/cm²

These properties were sufficient for use as a structural material.

Example 4

Figure 22A:
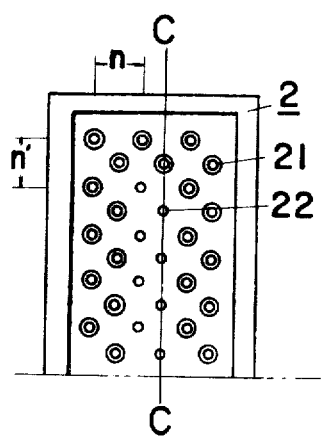
FIG. 22(a) is a partial front view of plate 2 used in Example 4, which is seen from the resin inlet side.
Figure 22B:
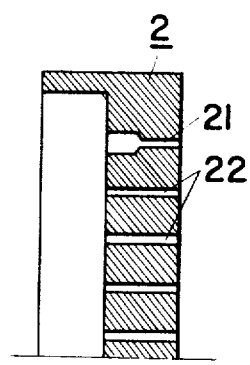
FIG. 22(b) is a cross-sectional view taken along the line C—C of FIG. 22(a).

In this example, the apparatus was the same as in Example 2, except die b. The die b used in this example was the same as in Example 1, except plate 2. Plate 2 used in this Example was as shown in FIG. 22, a rectangular plate having 150 mm in long side 1, 20 mm in short side m and 20 mm in thickness. Over the entire surface of plate 2 were 219 apertures, 21, 22, ... extending in the direction of the thickness. Said apertures were arranged in a double zigzag distribution of 6 (short side direction) × 4 (long side direction). The apertures which were disposed in the peripheral portion had a diameter with an enlarged portion at the resin inlet side, whereby the die b used in this example was different from that in Example 3. 150 apertures indicated by numeral 21, which were arranged in double lines in the peripheral portion had a diameter of 1.4 mm at the resin discharge side and an enlarged diameter of 2.0 mm at the resin inlet side, depth of the enlarged diameter being 10 mm. The remaining 69 apertures 22 were arranged in the center portion and had the diameter of 1.6 mm.

As the raw material, 25 Kg of polystyrene particles containing 7.9 weight % of butane were added to 65 Kg of polystyrene particles containing no expanding agent. To the mixture thus obtained were added 180 g of polybutene. Then the mixture was mixed well and further to the above mixture were added 2.7 Kg of fine powdery talc. The resulting mixture was employed as the raw material. The raw material was able to expand about 9 times in volume, when extruded through a die having a single aperture and expanded into a free space.

Said raw material was fed into an extruder and the process was carried out in the same way as in Example 2, thus a microporous article having 20 mm in thickness and 150 mm in width was obtained.

About said microporous article, measurements were conducted according to the same methods as in Example 1. The article had an average density of 0.25 g/cc as a whole.

Said article was divided into every strand, and regarding every strand, weight and volume were measured.

Individual resin strands had cross-sectional areas within the range of 0.023 $cm^2$ to 0.25 $cm^2$, and higher density in the outer portions and lower density in the center portions. The densities of the individual strands were within the range of 0.081 g/cc to 0.54 g/cc. Based upon these results, all strands were classified into the following three groups,
1. lower density strands having 0.081 g/cc to 0.240 g/cc in density
2. intermediate density strands having 0.241 to 0.260 g/cc in density, and
3. higher density strands having 0.261 to 0.356 g/cc in density.

Thus, the deviations in density among all strands were investigated. The results were as follows:

| Classification of strands | Number of strands | Volume ratio (%) | Average Density (q/cc) |
|---|---|---|---|
| lower density strands | 73 | 34.2 | 0.191 |
| intermediate density strands | 42 | 19.3 | 0.255 |
| higher density strands | 104 | 46.5 | 0.291 |

It was confirmed that the article had quite excellent properties because of further broad deviations in density.

The microporous article had the structure as shown in FIG. 17, in which the higher density strands were concentrated in outer portion of the article, and in that structure the article was as same as in Example 3.

About said article, surface hardness and nail pulling-off strength were measured in the same way as in Example 1, and the results were as follows.

Surface hardness: 22–30
Nail pulling-off strength: 11.2 Kg.

Example 5

Figure 23A:
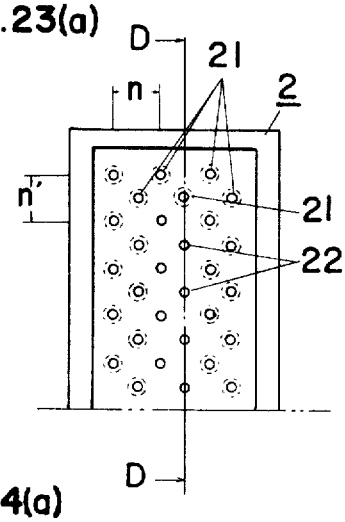
FIG. 23 (a) is a partial front view of plate 2 employed in Example 5, which is seen from the resin inlet side.
FIG. 23(b) is a cross-sectional view of plate 2 taken along the line D—D of FIG. 23(a).
Figure 23B:
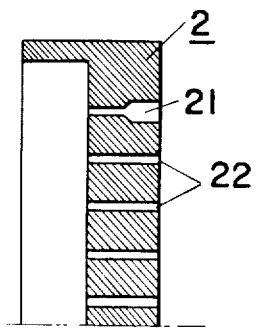

In this example, the raw material was identical with that employed in Example 4, and the procedure was identical with that of Example 3, however, plate 2 of die b employed in this example had different apertures in the dimensions, distribution and shape from those of Example 3. Said plate 2 is shown in FIG. 23 and is identical with that employed in Example 4 in distribution and dimensions of apertures, as easily seen from a comparison of FIG. 23 with FIG. 22. However, plate 2 employed in this example is different from Example 4 in that the enlarged diameter portions are provided at the resin discharge side. In particular, 150 apertures indicated by numeral 21, which were arranged in double lines in the peripheral portion had a diameter of 1.4 mm at the resin inlet side and an enlarged diameter of 2.0 mm at the resin discharge side, the depth of the enlarged diameter being 10 mm. The remaining 69 apertures, indicated by numeral 22, were arranged in the center portion and had a diameter of 1.6 mm.

Thus, a microporous article was obtained. Concerning said article, measurements were conducted in the same way as in Example 1, and the results were as follows.

The article had an average density of 0.24 g/cc as a whole.

The article was divided into individual strands and for every strand, weight and volume were measured.

Individual strands constituting said article had cross-sectional areas with the range of 0.032 to 0.200 $cm^2$, and higher density in the outer portions and lower density in the inner portions. The densities of the individual strands were within the range of 0.071 to 0.420 g/cc. Basing upon these results, all strands were classified into the following three groups,
1. lower density strands having 0.071 to 0.288 g/cc in density
2. intermediate density strands having 0.228 to 0.252 g/cc in density, and
3. higher density strands having 0.252 to 0.420 g/cc in density Thus, the deviations in density among all strands were investigated. The results were as follows.

| Classification of strands | Number of strands | Volume ratio (%) | Average density (g/cc) |
|---|---|---|---|
| lower density strands | 101 | 47.1 | 0.140 |
| intermediate density strands | 12 | 5.5 | 0.248 |
| higher density strands | 107 | 47.4 | 0.345 |

It was confirmed that the article had quite excellent properties below because of the above deviations in density.

Regarding said article, surface hardness and nail pulling-off strength were measured in the same way as in Example 1, and the results were as follows.

Surface hardness: 35 – 45
Nail pulling-off strength: 12.5 Kg Comparing above results with those of Example 3, it is clear that the article obtained in this example is improved a little in nail pulling-off strength and was much improved in surface hardness over that of Example 3.

Example 6

Figure 24A:
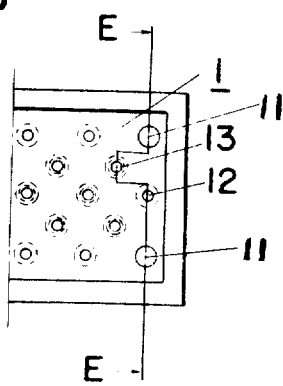
FIG. 24 (a) is a partial front view of plate employed in Example 6, which is seen from the resin inlet side.
Figure 24B:
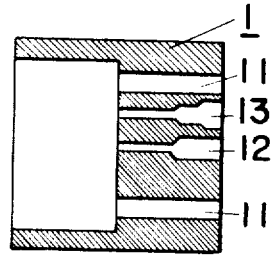

In this example, the raw material was identical with that employed in Examples 4 and 5, and the procedure was identical with that of Example 4, however, die b employed in this example was different from that of Example 4 in that the die b had a single plate 1, as shown in FIG. 24, instead of plates 1 and 2. In this example, the procedure was carried out without circulating the medium in the temperature regulator.

Plate 1 (FIG. 24) is a rectangular plate having a long side of 36 mm, a short side of 20 mm, and a thickness of 30 mm. The plate has 23 apertures perforated in double zigzag distribution of 7 × 7. Said apertures are classified into three groups according to the shape thereof. The first group includes four apertures which are located at the corner and are denoted by numeral 11 in FIG. 24. Said apertures have the identical diameter of 2.5 mm throughout the whole length. The second group includes the eight apertures which are located in the peripheral portion and denoted by numeral 12 in FIG. 24. Said apertures 12 have a diameter of 1.6 mm at the resin inlet side and an enlarged diameter of 2.2 mm at the resin discharge side. Said enlarged diameter begins at a depth of 1.6 mm from the resin inlet side. The third group includes 11 apertures which are located in the center portion and denoted by numeral 13 in FIG. 24. Said apertures 13 have a diameter of 1.6 mm at the resin inlet side, a first enlarged diameter of 2.2 mm in the middle portion, and a second enlarged diameter of 2.4 mm at the resin discharge side. Said first enlarged diameter begins at a depth of 15 mm from the resin inlet side, and said second enlarged diameter at a depth of 22.5 mm.

Employing the above-mentioned apparatus, a microporous article having the rectangular cross-section of 20 × 36 mm was obtained. Regarding said article, measurements were conducted in the same way as in Example 1. The results were as follows.

The article had an average density of 0.213 g/cc as a whole. Individual strands constituting said article had cross-sectional areas within the range of 0.031 to 0.483 cm$^2$, and higher density in the outer portions and lower density in the inner portions.

Then, in order to investigate the expanding degrees and their distribution, the article was divided into individual strands, and regarding every strand, weight and volume were measured. The densities of the individual strands were within the range of 0.075 to 0.341 g/cc. Based upon these results, all strands were classified into the following three groups in the same way as in the preceding examples:

1. lower density strands having a density of 0.075 to 0.202
2. intermediate density strands having a density of 0.202 to 0.224 g/cc, and
3. higher density strands having a density of 0.224 to 0.341 g/cc Regarding above three groups, the number of strands, volume and average density were investigated. The results were as follows.

| Classification of strands | Number of strands | Volume ratio (%) | Average density (g/cc) |
|---|---|---|---|
| lower density strands | 8 | 45.5 | 0.146 |
| intermediate density strands | 3 | 7.0 | 0.203 |
| higher density strands | 12 | 48.5 | 0.278 |

The article had higher density strands concentrated in the center portion of the article, and had a structure similar to that shown in FIG. 5.

It was confirmed that the article had good properties as mentioned below because of above structure.

Regarding said article, surface hardness and nail pulling-off strength were measured in the same way as in Example 1, and the results were as follows.

Surface hardness: 15 – 20
Nail pulling-off strength: 13.8 Kg

The article was suitable for use as structural material, because it had large nail pulling-off strength and a fine appearance as well as properties similar to natural wood having straight grain structure.

Example 7

Figure 25:
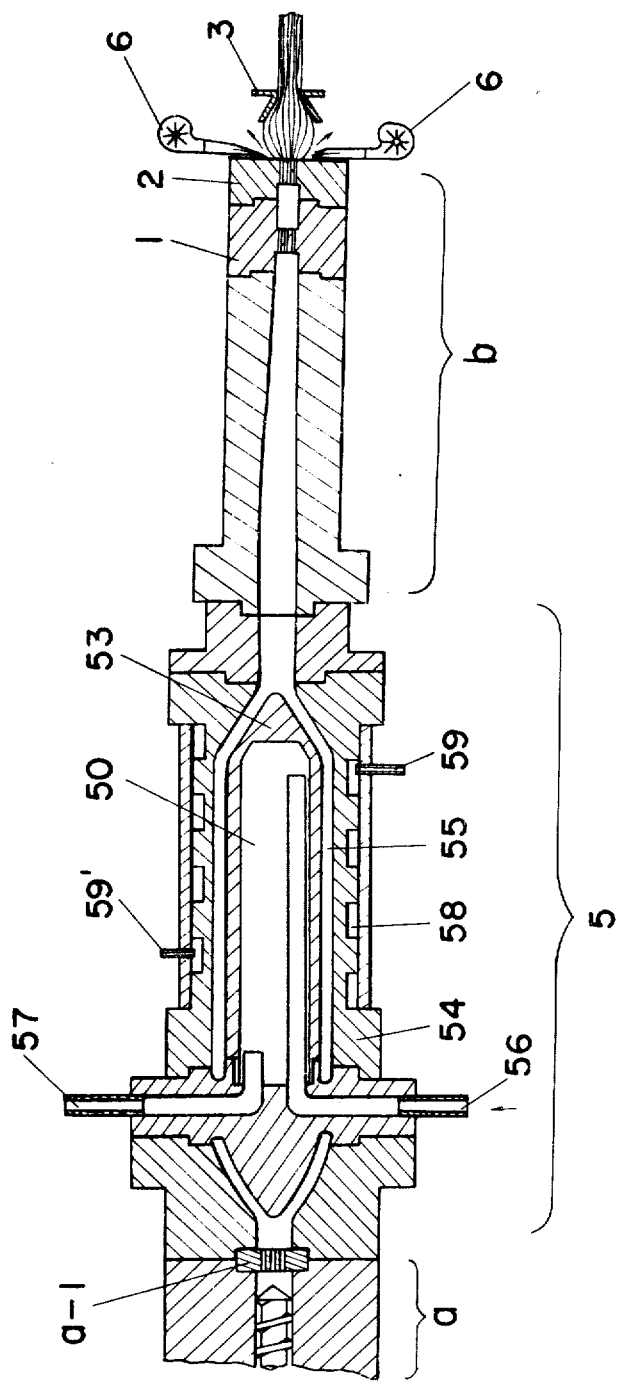
FIG. 25 is a schematic cross-sectional view of a specific embodiment as described in Example 7.

In this example, the raw material, apparatus and procedure were identical with those in Example 3, except that a blower 6 (FIG. 25) was established at the resin discharge end of die b, wherein the extruded resin strands disposed in the outer portion were cooled by blowing air of room temperature. In this manner, a microporous board which was similar to that of Example 3 and which had a density of 0.26 g/cc was obtained.

About said article, surface hardness was measured in the same way as in Example 1, and was found to have a large value of 50 – 60. However, the article had a rough surface.

Example 8

Figure 26:
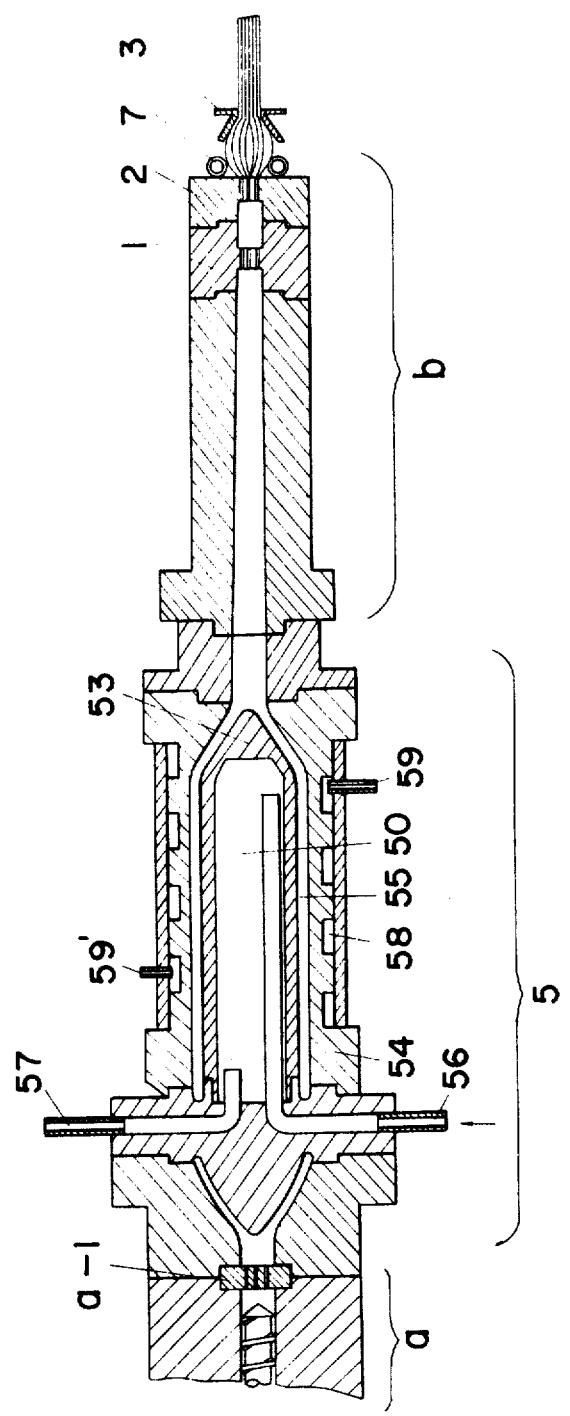
FIG. 26 is a schematic cross-sectional view of another specific embodiment.

In this example, the raw material, apparatus and procedure were identical with those of Example 7, except that the pipe 7 (FIG. 26) was established instead of blower 6, (FIG. 25) and in said pipe was circulated a cooling medium, thus the extruded resin strands disposed in the outer portion were cooled by said pipe. In this example air at 20°C was circulated through pipe 7, and a microporous article having a high surface hardness was obtained. The article had a surface hardness of 55 – 65, and a smooth surface which is quite different from that of Example 7.

While several embodiments of the invention have been shown and described, other variations will be readily apparent to those skilled in the art. Therefore, the invention is not limited to these embodiments but is intended to cover all such variations as may be within the scope of the invention defined by the following claims.

We claim:

1. In an apparatus for preparing synthetic wood which includes an extruding means for extruding softened thermoplastic resin containing expanding agents, die means disposed at the discharge end of said extruding means adapted to permit the extruded thermoplastic resin to pass therethrough to form a plurality of expanded strands, said die means including a first chamber and at least one plate having a plurality of apertures therethrough disposed on the outlet side of said chamber, and coalescing means disposed at the outlet side of said die means for coalescing said plurality of expanded strands into a microporous article having a desired cross-sectional area while said strands are still in a softened state, the improvement comprising at least one of said die and said coalescing means being constructed to restrict the space in which each individual strand is allowed to expand to provide each of said strands with a higher density outer surface.

2. The improvement according to claim 1 further comprising a cooling element positioned and arranged so as to effect cooling of the outer surface the plurality of expanded strands at a point near the point of emergence of the expanded strands from the die means.

3. The improvement according to claim 1 wherein the apertures of said first plate of said die means have different land lengths to provide equal resin flow therethrough.

4. The improvement according to claim 1 further comprising resin temperature regulator means disposed between said extruding means and said die means.

5. The improvement according to claim 1 wherein said die means further includes a second chamber disposed on the outlet side of said first plate and a second plate having a plurality of apertures therethrough disposed on the outlet side of said second chamber.

6. The improvement according to claim 1 wherein at least some of said apertures are different from the remaining apertures.

7. The improvement according to claim 6 wherein said apertures differ in length.

8. The improvement according to claim 6 wherein said apertures differ in cross-sectional area.

9. The improvement according to claim 6 wherein said apertures are substantially cylindrical and exhibit different diameters.

10. The improvement according to claim 6 wherein at least one of said apertures has a small area opening at one end and a large area at the other end.

11. The improvement according to claim 1 wherein said plate is provided with a variable density of apertures.

12. The improvement according to claim 1 wherein the total cross-sectional area of said apertures is relatively small in relation to the expanding ability of said thermoplastic resin such that each of the resultant strands exhibits a high density outer surface and a low density interior.

13. The improvement according to claim 1 wherein said apertures are constructed such that different strands have different densities.

14. The improvement according to claim 1 wherein said plate is constructed to yield substantially identical strands each having low density interiors and high density skins.

15. The improvement according to claim 14 wherein said chamber increases in cross-sectional area from the end adjacent said extruding means to said plate, said apertures being constructed to produce an overall pressure drop distribution compensating for the variance in the pressure drop produced by the change in the cross-sectional area of said chamber.

16. The improvement according to claim 15 wherein a second, uniformly aperture plate is disposed on the outlet side of the first plate.

17. The improvement according to claim 15 wherein at least a portion of said apertures have the same length and have enlarged and smaller portions, the apertures closest to the periphery having enlarged sections of greater length than those nearer the center.

18. The improvement according to claim 1 wherein said apertures are constructed to produce a lower pressure drop in the center apertures and a higher pressure drop in the peripheral apertures.

19. The improvement according to claim 18 wherein the center apertures have larger cross-sectional areas than those of the peripheral apertures.

20. The improvement according to claim 18 wherein the plate is thinner in the center than in the periphery.

21. The improvement according to claim 1 wherein the inlet sides of at least a number of the individual apertures have a relatively small cross-sectional portion and the outlet sides have a relatively large cross-sectional portion, the size of the relatively large cross-sectional portions being such the expansion of said strands is restricted thereby.

22. The improvement according to claim 1 wherein peripheral apertures have enlarged inlet portions the lengths of which diminish toward the center apertures, the center apertures exhibiting constant diameters.

23. The improvement according to claim 1 wherein said coalescing means includes at least one pair oppositely disposed, non-driven rolls rotatable by frictioned contact with said strands.

24. The improvement according to claim 23 wherein said coalescing means includes a plurality of pairs of said rollers positioned such that said strands are nipped and compressed on all four sides bordering the moving path of said strands.

25. The improvement according to claim 23 wherein said coalescing means further comprises a tapered frame engaging opposite sides of the group of strands in advance of said rollers.

26. The improvement according to claim 1 wherein said coalescing means comprises a tapered frame engaging and compressing opposite sides of the group of strands leaving said die means.

27. The improvement according to claim 1 further comprising blower means positioned at the outlet end of said die means for cooling said strands.

28. The improvement according to claim 1 further comprising heat exchange means positioned at the outlet side of said die means for cooling said strands.

29. An apparatus for preparing synthetic wood comprising an extruding means for extruding softened thermoplastic resin containing expanding agents, die means disposed at the discharge end of said extruding means adapted to permit the extruded thermoplastic resin to pass therethrough to form a plurality of expanded strands, said die means including a first chamber, at least one plate having a plurality of apertures therethrough disposed on the outlet side of said chamber, a second chamber disposed on the outlet side of said first plate and a second plate having a plurality of apertures therethrough disposed on the outlet side of said second chamber, and coalescing means disposed at the outlet side of said die means for coalescing said plurality of expanded strands into a microporous article having a desired cross-sectional area while said strands are still in a softened state, at least one of said die and said coalescing means being constructed to restrict the space in which each individual strand is allowed to expand to provide each of said strands with a higher density outer surface.

30. The apparatus according to claim 29 further comprising resing temperature regulator means disposed between said extruding means and said die means.

31. The apparatus according to claim 29 wherein the apertures of said first plate of said die means have different land lengths to provide equal resin flow therethrough.

32. The apparatus according to claim 29 further comprising a cooling element positioned and arranged so as to effect cooling of the outer surface the plurality of expanded strands at a point near the point of emergence of the expanded strands from the die means.

33. The apparatus according to claim 29 wherein said coalescing means includes a plurality of pairs of said rollers positioned such that said strands are nipped and compressed on all four sides bordering the moving path of said strands.

* * * * *